United States Patent [19]

Perry

[11] Patent Number: 5,771,670
[45] Date of Patent: Jun. 30, 1998

[54] BALANCED-WHEELED GRASS AND WEED TRIMMER APPARATUS

[76] Inventor: Ben C. Perry, 703 Texas St., Kannapolis, N.C. 28083

[21] Appl. No.: 574,109

[22] Filed: Dec. 18, 1995

Related U.S. Application Data

[63] Continuation-in-part of Ser. No. 381,349, Jan. 31, 1995, abandoned.

[51] Int. Cl.$^6$ ................................................. A01D 75/10
[52] U.S. Cl. ............................... 56/12.1; 56/16.7; 30/276
[58] Field of Search .................................. 56/12.1, 12.7, 56/16.7; 30/276

[56] References Cited

U.S. PATENT DOCUMENTS

| | | | |
|---|---|---|---|
| 3,018,602 | 1/1962 | Diesterweg | 56/12.7 |
| 3,996,726 | 12/1976 | Irelan et al. | 56/16.7 |
| 4,018,037 | 4/1977 | Weber | 56/16.7 |
| 4,389,836 | 6/1983 | Lowery et al. | 56/12.7 |
| 4,688,376 | 8/1987 | Wolf, Sr. | 56/12.7 |
| 4,879,869 | 11/1989 | Buckendorf, Jr. | 56/12.7 |
| 4,936,886 | 6/1990 | Quillen | 56/6.7 |
| 5,313,770 | 5/1994 | Smothers | 56/16.7 |
| 5,408,816 | 4/1995 | Cartier | 56/12.7 |

OTHER PUBLICATIONS

Advertisement In "Rodale's Practical Homeowner" Of the DR Trimmer/Mower Sep. 1987.

*Primary Examiner*—Terry Lee Melius
*Assistant Examiner*—Heather Shackelford
*Attorney, Agent, or Firm*—Judith E. Garmon

[57] ABSTRACT

A two-wheeled lawn trimmer, controlled with a handle attached to a frame which receives a conventional gasoline or electric powered rotary lawn trimmer, and provides balanced maneuverability with low operator forces while providing complete trimming access and cutting height control. Additionally the trimmer provides the operator access to vary the rotary cutting head speed as well as the ability to stop the motor device with controls mounted on the handle grip assembly.

9 Claims, 5 Drawing Sheets

BALANCED-WHEELED GRASS AND WEED TRIMMER APPARATUS

This application is a CIP of Ser. No. 08/381,349 filed Jan. 31, 1995 now abandoned.

BACKGROUND AND DESCRIPTION OF PRIOR ART

This invention relates to weed and grass trimmers which are mobile and utilize low operator leverage forces to control and manipulate the trimmer. Lawn trimmers have previously been designed for use by persons with average physical abilities and are fairly easy to operate for short periods by these physically able persons. A need for a trimmer that can perform very well and be operated by persons of limited physical abilities, i.e.. elderly and handicapped, has been attempted by several prior art patents. There are benefits associated with some of the prior art but prior art does not singularly and completely eliminate the many problems that result in the use of such devices. The problems encountered are typically: 1) awkward and cumbersome use due to uneven weight distribution and wheel size and location, 2) lack of trim action on both sides and front of device, 3) lack of support of the motor, 4) loss of the automatic feed feature, 5) excessive operator forces required to maneuver the unit and, 6) lack of complete cutting height control.

The present invention eliminates all of the above problems simultaneously in a manner not disclosed in the prior art.

U.S. Pat. No. 5,048,615 to Feldman discloses a three-wheeled trimmer that utilizes a cutting head that is effective only on one side of the apparatus. The effective weight of the motor is substantially forward of the rear axle which requires operator forces during use similar to those needed to manipulate a lawn mower.

U.S. Pat. No. 4,922,694 to Emoto discloses a two-wheeled trimmer support that is adaptable for use with electric trimmers wherein the only weight to support is the cutting head assembly itself. The controllability is limited critically by the point of attachment of the support means and the positioning of the wheels.

U.S. Pat. No. 4,891,931 to Holland discloses a trimmer wheel kit that is adaptable to support a cutting head assembly wherein the weight to be supported is at the lower end.

U.S. Pat. No. 4,531,350 to Hutchmacher discloses a three-wheeled frame support for an electric trimmer which in effect converts it into a lawn mower.

SUMMARY OF PRESENT INVENTION

The present invention will be discussed here as a complete unit, although it should be noted that the components associated with the mobility of the unit can be utilized as a kit by persons possessing basic mechanical skills and tools to convert their existing trimmer to adapt to mounting on the mobility kit.

The drive means in the preferred embodiment utilizes a gasoline powered engine but it should be noted that any suitable drive means can be utilized that includes a rotating shaft as the final drive output means. The present invention is a weed and grass trimmer that solves all problems and concerns with existing trimming devices. Prior art approaches at best, solve a few of the many problems that were eliminated with the present invention. With the present invention, the weight is completely supported and the center of gravity is just forward of the single axle to provide very simple maneuvering which is the foremost desired feature for elderly and handicapped persons. The trimmer has only two wheels, which eliminates cumbersome movement along uneven surfaces. The rotary cutting head is extended forward to allow for a large diameter cut without obstruction being created by the wheels. The bumping action necessary to advance the cutting line is easily accomplished with a quick upward movement of the control handle. Cutting height is easily regulated by the operator since the center of gravity is close to the axle which gives the trimmer well balanced operation. The unit can be made as a whole with the trimming device included or as an inexpensive kit to be added to other trimmers. The trimmer will trim close to any wall or obstruction on either side of the trimmer. Prior art approaches typically have three or four wheels, like small lawn mowers that do not eliminate all problems associated with close easy trimming. The present invention consists of a trimmer unit with all components mounted to the axle and frame assembly, and with the control means being simply one handle. The single axle passes through the rear of the substantially triangular base frame. The cutting head is mounted to the front of the base frame with the motor and drive shaft angled rearward to place the effective weight of the motor slightly forward of the rear axle. The length of the axle can vary but is chosen for best reconciliation of both maneuverability and straight line stability.

The control handle is a tubular shaft with the throttle cable passing through the center. The throttle cable is encased in a flexible tubing extending the distance between the lower end of the handle and the connecting point on the engine. The control handle is attached to the base frame at the rear center where ease of control is best given to the operator for turning, balancing cutting height and maintaining forward movement.

DESCRIPTION OF THE PREFERRED EMBODIMENT

Figure 1:
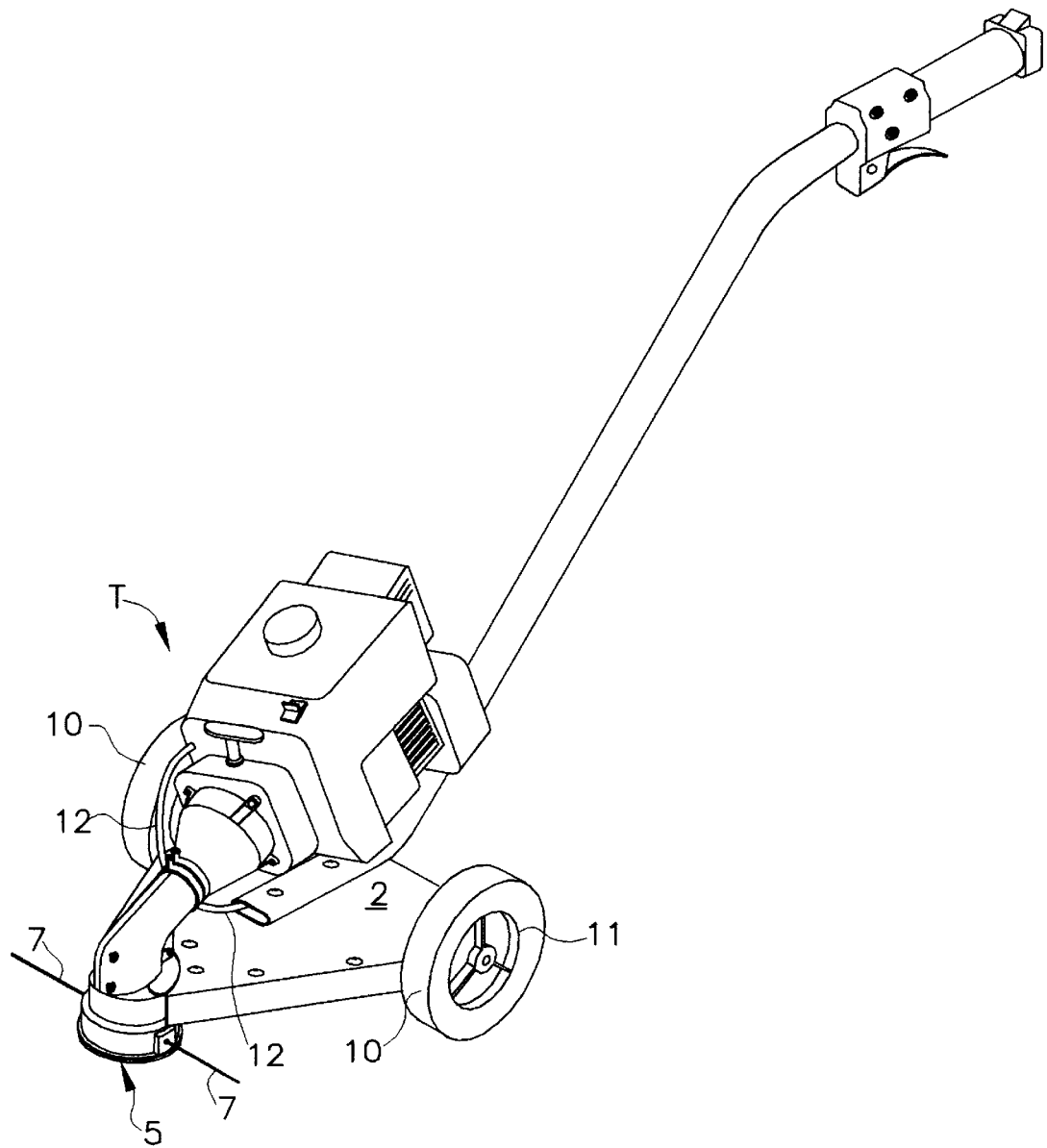
FIG. 1 is a perspective view of the preferred embodiment of the present invention.
Figure 2:
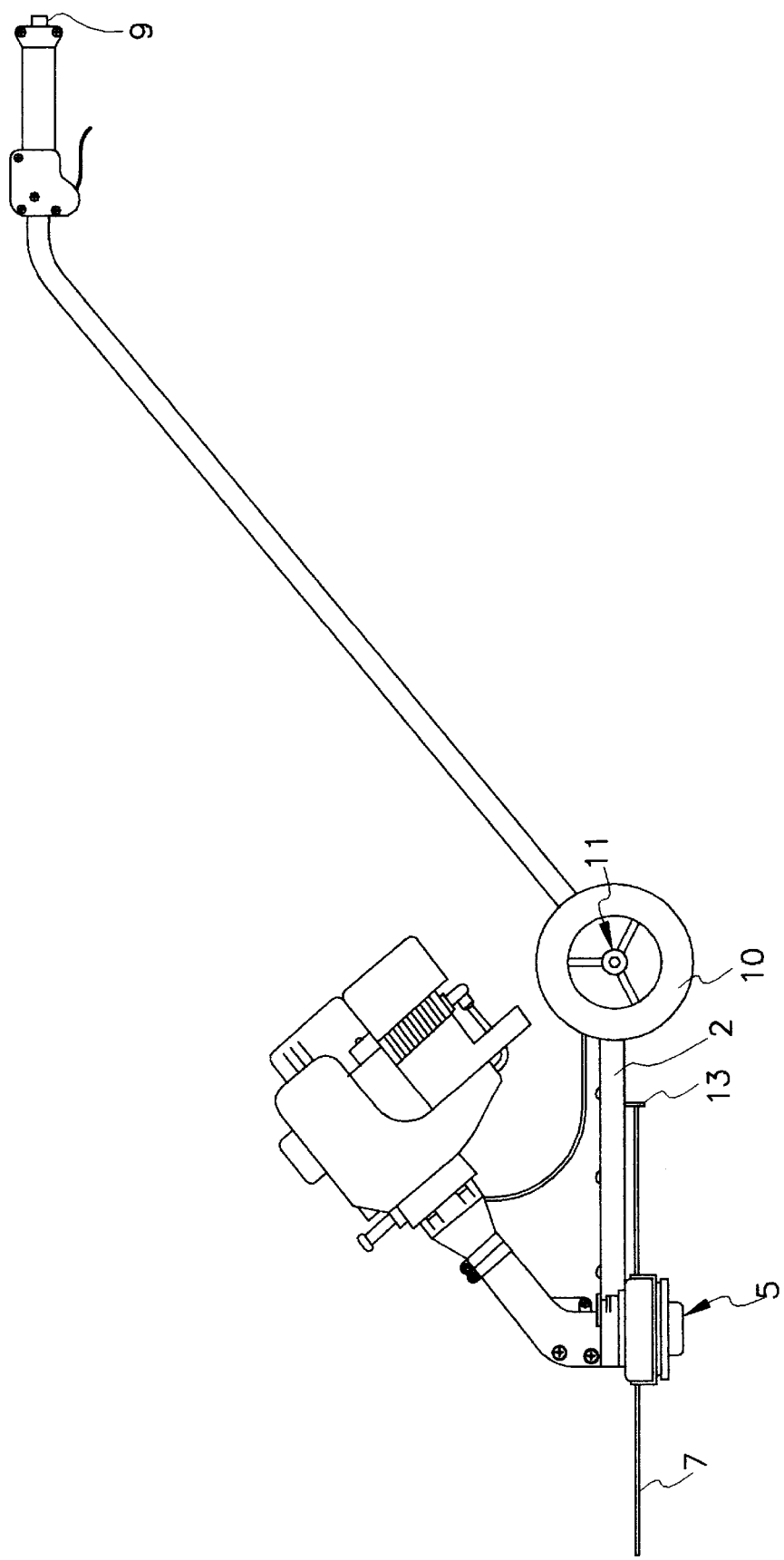
FIG. 2 is a side view of the preferred embodiment of the present invention.
Figure 3:
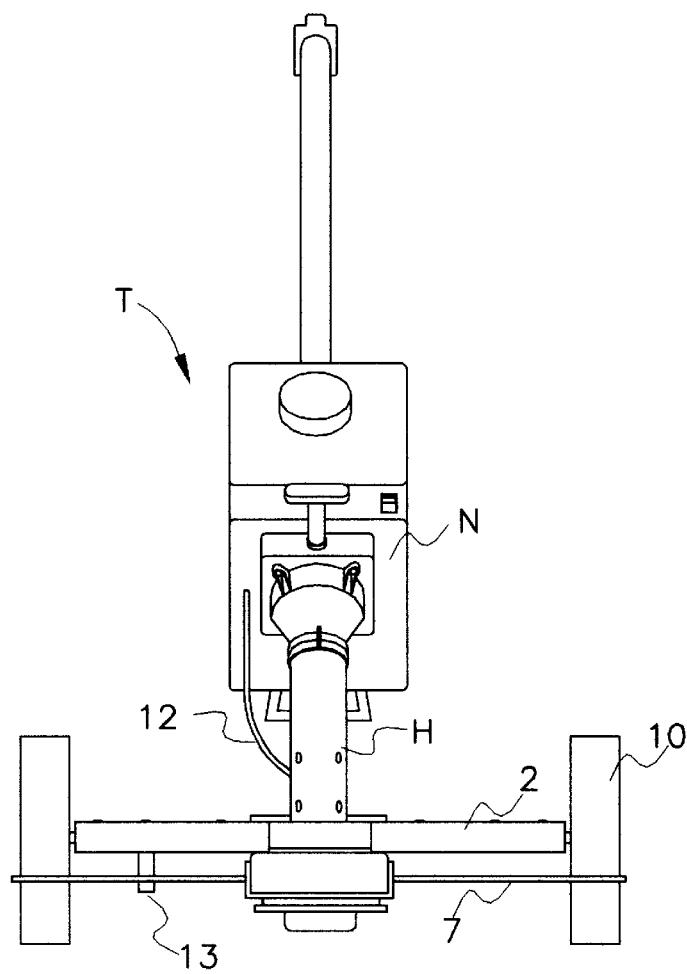
FIG. 3 is a front view of the preferred embodiment of the present invention.
Figure 4:
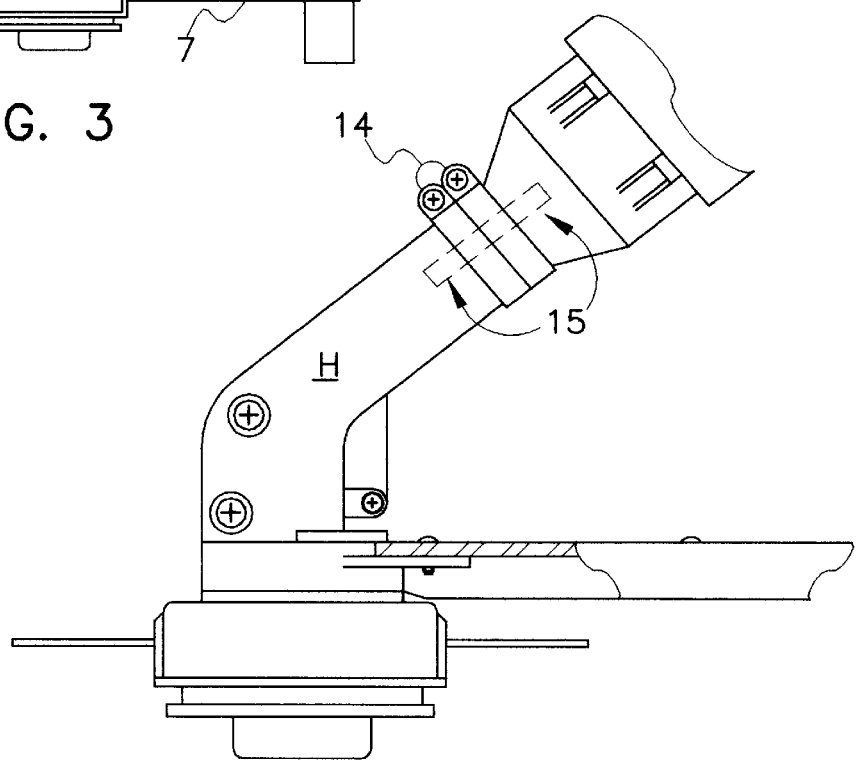
FIG. 4 is a detailed view, in partial cross-section and phantom, of the external housing which contains the clutch assembly and the novel drive connection utilized in the preferred embodiment of the present invention.

The components incorporated in the assembly of the mobile frame portion of the present invention are simple to manufacture and assemble. Referring to FIG. 1 it is shown the overall assembled preferred embodiment with a typical gasoline powered lawn trimmer T adapted to the mobility kit. As shown in FIGS. 1 and 2 the previous mentioned center of gravity can be easily judged to be slightly forward of the rear axle 11, which provides very good stability and ease of cutting height control with low operator forces. FIG. 2 also shows the clearance provided between the cutting line 7 and the wheels 10. This clearance provides the ability to keep an adequate length of trim line extended about the cutting head assembly 5 to allow for close and easy trimming around obstructions. The maximum length of the cutting line 7 is controlled by the line cutter blade 13 mounted to the base frame 2. The front view as shown in FIG. 3 shows the typical gasoline powered lawn trimmer T as mounted on the unit with the drive shaft 4. Also as shown in FIG. 3 it is easy to recognize that the cutting path of the cutting line 7 extends beyond the outer edge of the wheels 10. Referring to FIG. 4, the drive shaft 4 can be seen in more detail with a typical attachment means provided to angle the motor towards the aft area at an angle to move the effective center of gravity to the desired area. The internal drive attachments located within the drive shaft 4 are accessible by removing the two clamps 14, as shown in FIG. 4. The specific internal drive attachments are typically a clutch gear assembly contained within a sleeve to operatively connect the motor drive means to the internal drive shaft components as shown in FIGS. 4 and 7.

Figure 7:
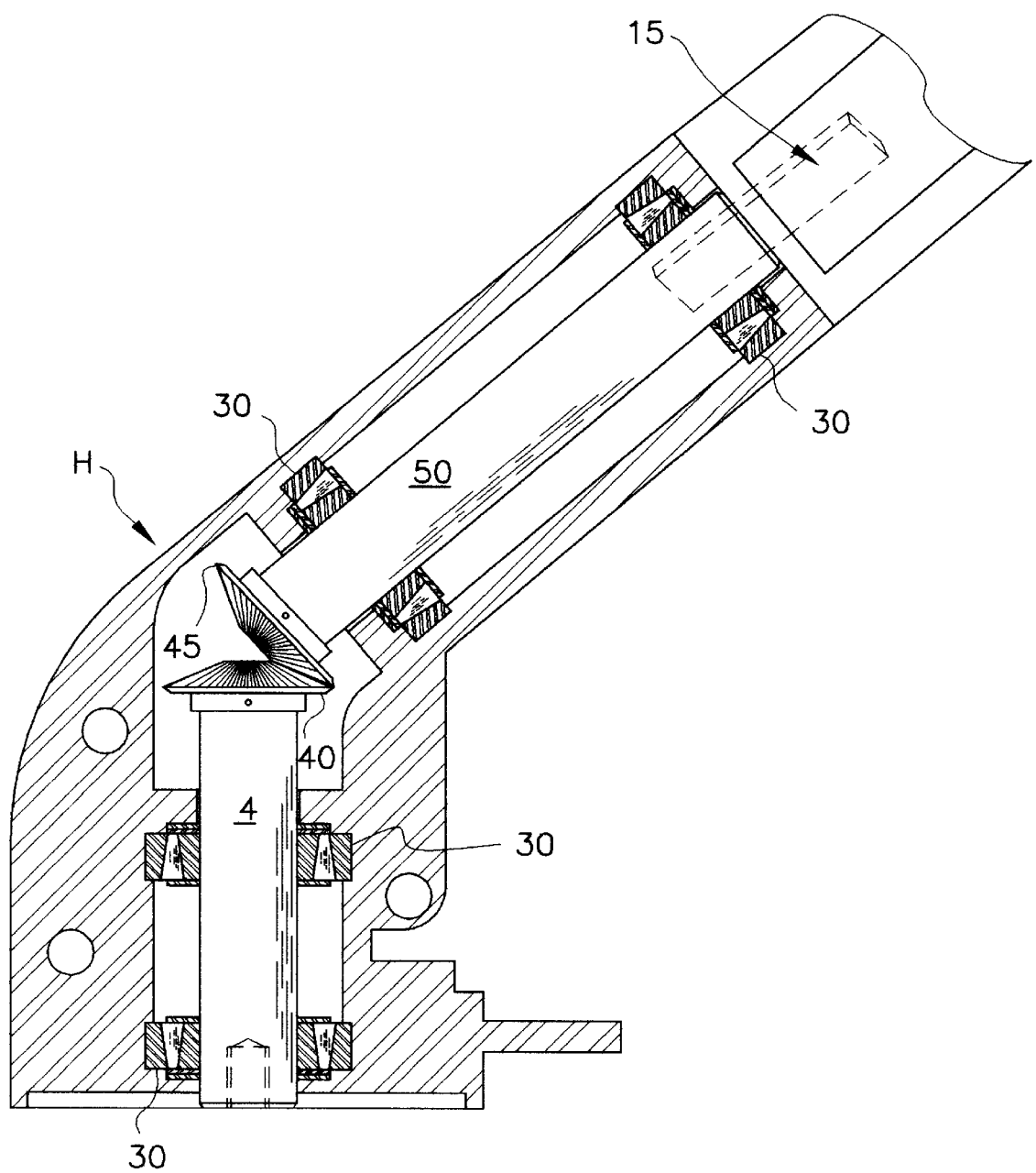
FIG. 7 is a cross-sectional view taken along lines 7—7 of FIG. 4.

The specifics of a preferred approach to the structure of the drive shaft 4 are best shown in the FIG. 7 cross-sectional view. In this view, the housing H surrounding the drive shaft 4 has been cut away to reveal the shaft and its connection to the blade drive. With the housing H cut away, the shaft 4 is shown encased within a pair of bearings 30, and including a toothed gear 40 mounted on the upper end thereof. The toothed gear 40 is positioned to operatively mesh with a second toothed gear 45, mounted on the motor output shaft 50.

The differential relationship between the toothed gears 40 and 45 is such that the ratio between the two is selected and structured to produce a greater cutting head speed, with less output from the motor shaft. In most existing trimmer drives of a non-wheeled design, there is a long, flexible output shaft driven by the motor, and connected to a gear on the end thereof, which gear is connected to the geared drive shaft in the cutting head. Because of the extended length of the output shaft from the motor, there is considerable torque exerted on the drive, causing it to experience damage and resultant weakness, ultimately leading to failure. Additionally, because of this torque and the resulting flexion of the output shaft, the energy output to the trimmer cutting head is substantially reduced. Therefore, the present arrangement, wherein the extended motor output shaft is unnecessary and therefore eliminated, not only increases the life of the equipment, but provides for an increased output efficiency relationship between the motor drive and the trimmer head.

To accomplish this reduction of torque and increased efficiency, it has been realized in the present invention that, due to the inclusion of a relatively short, substantially flat and rectangularly shaped connector 35, positioned between the clutch top head gear 45 in the drive shaft, thereby eliminating the conventional long output shaft, the motor can now be operated at approximately one-half normal speed, with no loss of output power.

Figure 6:
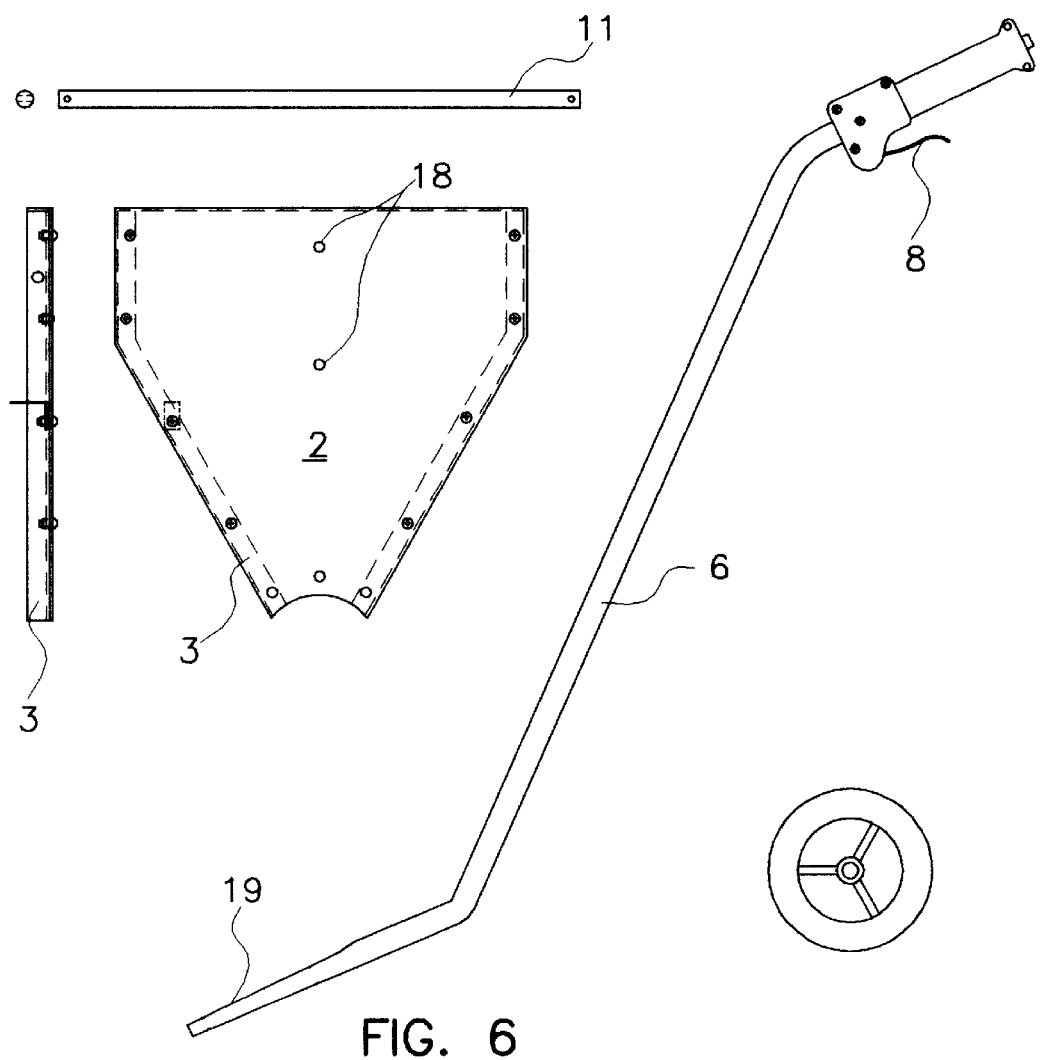
FIG. 6 is a complete view of the mobility kit showing all associated components of the preferred embodiment of the present invention.

Referring to FIG. 6, it illustrates the components that are available in kit form to adapt to an existing lawn trimmer. The base frame 2 is constructed of aluminum with additional aluminum angle 3 that is attached around the edges of the base frame 2 for reinforcement.

Figure 5:
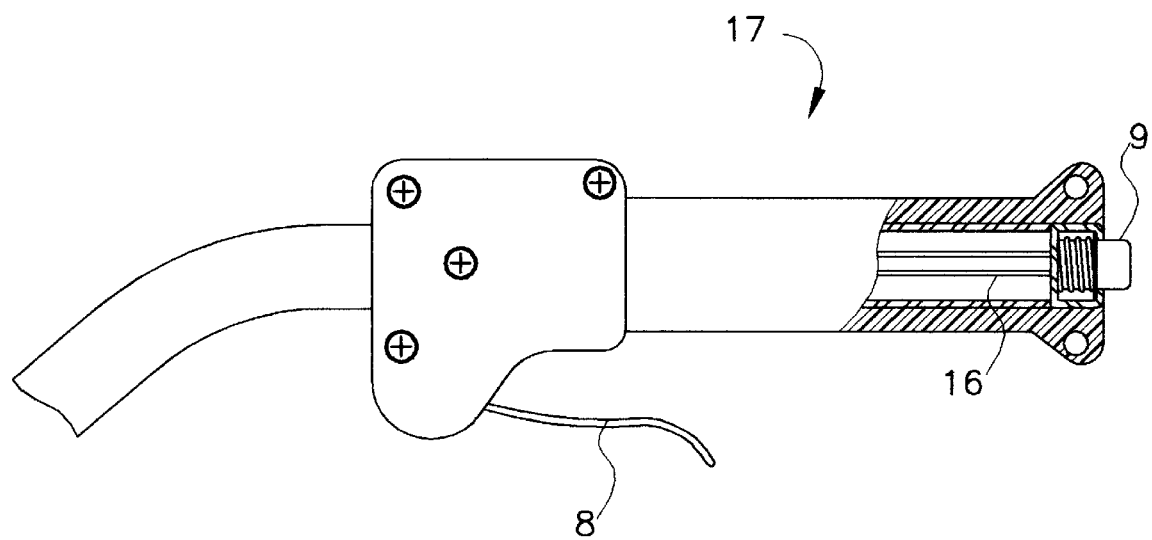
FIG. 5 is a detailed view of the operator control handle grip assembly of the preferred embodiment of the present invention.

The preferred attachment means for the reinforcement is with the use of rivets while the additional components are attached with screws to facilitate removal in the event of needed repairs or replacement of these components. It should be noted that the base frame 2 can be constructed with a single piece of aluminum or other durable material that is formed to accommodate the mounting of the additional components i.e.. axle 11, handle 6 and any cutting head. The reinforced aluminum angle 3 is used for structure to attach the axle 11 to the rear of the frame 2. With reference to FIGS. 4 and 7, these illustrate the novel method of attaching the drive means 4, the cutting head assembly 5 and the handle 6 to the base frame 2. The handle 6 is formed at its lower end to create a flat edge 19 on the top and bottom and is also curved to facilitate the mounting to the base frame 2 at holes 18. The handle 6 has a curve at its upper end to provide the operator a natural grip when in the walking stance and to provide maximum leverage action on the trimmer. The detail in FIG. 5 shows the handle grip assembly 17 with its associated components and features. It illustrates the connection of throttle control 8 to a conventional throttle cable protected in tubing 12 (shown in phantom in FIG. 5). The throttle control lever 8 controls the speed of the rotary cutting head assembly. The trigger action throttle lever 8 is typical of those found on most gasoline lawn trimmers and is implemented on the present invention by utilizing a flexible tubing 12 (FIG. 1), to pass the cable through the tubular handle 6 to the necessary mechanical attachment on the motor 1. The button 9 on the end of the handle grip assembly 17 is an electrical motor stop switch which is activated in a momentary manner to stop the motor which can be either electric or gasoline. The button 9 is a spring loaded device that when pressed makes contact between two wired inner contacts 16 inside the handle grip assembly 17.

The specific electrical operation of the motor stop button 9 is dependent on the requirements of the trimmer adapted for use with the present invention and is readily implemented by those skilled in the art.

What is claimed is:

1. A balanced, wheeled, rotary string grass and weed trimmer apparatus for mounting a gas or electric powered rotary weed trimmer can be converted from a hand or shoulder carried model, to a model adapted for use on a wheel-mounted carriage, said apparatus including:

A. a base frame having:
   i) an axle mounted on and extending through said frame at the rearward, aft portion of said frame, and said axle including a wheel operatively mounted on each end thereof;
   ii) a rotary string cutting head assembly mounted on the underside of said frame at the leading edge thereof,
   iii) a control handle mounted on the rearward, aft portion for guiding and steering said wheeled rotary string weed trimmer;

B. said control handle including an upper end having a grip assembly thereon, and a lower end attached to said frame means;

C. a motor having an output shaft; a drive shaft means operatively connecting said output shaft of said motor to said rotary string cutting head assembly, for driving said rotary string cutting head; said motor being mounted on said frame in a position such that the center of gravity of said apparatus is slightly forward of said axle;

D. said drive shaft means including a pair of meshing toothed gears having a differential ratio selected to produce greater cutting head speed while requiring less output speed from said motor;

E. a throttle control means mounted on said control handle in an area substantially adjacent said grip assembly; and F. means for operatively connecting said throttle control means to said motor;

G. a connector means having a relatively flat, rectangular shape, and a relatively short length, for connecting said drive shaft to said motor output shaft;

whereby the torque normally produced by the conventional extended length of a flexible motor output shaft required on hand or shoulder carried rotary weed trimmers is eliminated by use of said connector means; which connector means operatively connects the motor output shaft directly to said drive shaft.

2. Apparatus according to claim 1 wherein said cutting head assembly has the drive apparatus shaft connected to said cutting head assembly and said base frame at the forward area at an angle to displace the motor device over the aft area of said base frame.

3. Apparatus according to claim 1 wherein said control handle is tubular with an operator control cable passing through the center for controlling the rotating speed of said cutting head assembly.

4. The apparatus of claim 1 wherein said base frame is constructed of aluminum angle and sheet metal for strength and to serve as a guard to shield debris.

5. Apparatus according to claim 1 wherein said base frame has decreasing width in the forward area.

6. The apparatus of claim 1 wherein said rotary cutting head assembly rotates and cuts in a substantially horizontal plane.

7. The apparatus of claim 1 wherein said axle has at least two non-castoring wheels of at least eight inches attached.

8. The apparatus of claim 1 wherein said base frame is constructed of heavy duty plastic to serve as a guard to shield debris.

9. The apparatus of claim 1 wherein said control handle includes means for stopping said rotary cutting head assembly.

\* \* \* \* \*